UNITED STATES PATENT OFFICE.

SANFORD A. HICKEL, OF ROANE COUNTY, WEST VIRGINIA, AND CALVIN, JAMES, AND BENJN. F. ARMSTRONG, OF JACKSON COURT HOUSE, ASSIGNEES OF SANFORD A. HICKEL.

IMPROVEMENT IN TANNING.

Specification forming part of Letters Patent No. 50,872, dated November 7, 1865; Reissue No. 2,418, dated December 11, 1866.

*To all whom it may concern:*

Be it known that SANFORD HICKEL, of Roane county, in the State of West Virginia, invented a new and Improved Mode of Tanning Hides into Leather; and we do hereby declare the following to be a full, clear, and exact description of the same, sufficient to enable one skilled in the process of tanning to make use of it.

The material consists of ground bark and manure mixed in different proportions, according to the size and thickness of the hides to be tanned and the kind of leather to be made of them. The manure we prefer to use is that taken from the stable of a horse, mule, or analogous animal; but we propose to use any which will accomplish the desired result.

All hides and for all kinds of leather should be prepared precisely as similar hides and for similar leather are usually prepared, and they are placed in ooze prepared in the usual manner, and the strength of such ooze must always be kept up by the removal of old bark and supply of fresh. Then, for tanning heavy hides into sole-leather, mix five bushels of ground bark with one of manure, or mix in that proportion. Thus, to tan forty heavy hides, mix ten bushels of bark with two bushels of manure. At the end of three days remove the old bark and add ten bushels of fresh, and at the end of five or six days thereafter again remove the old bark and add fresh, and continue, and preserve the strength of the ooze, as before directed. At the end of twenty or twenty-five days after placed in ooze add a bushel and a half of manure, and the hides will be tanned within sixty or ninety days after put into ooze.

To tan heavy hides into upper-leather, mix in the proportion of eight bushels of bark to a bushel and a half of manure. Thus, to tan forty heavy sides into upper-leather, mix eight bushels of bark with a bushel and a half of manure. At the end of three days remove the old bark and add nine bushels of fresh. Within ten or twelve days after placed in ooze, shave the hides and again remove old bark and add fresh. At the end of fifteen days after placed in ooze add two bushels of manure, and within forty or fifty days after placed in ooze the hides will be completely tanned.

To tan kip-skins, mix in the proportion of seven bushels of bark with a bushel and a half of manure. Thus, to tan fifty or sixty kip-skins, mix seven bushels of bark with a bushel and a half of manure. At the end of three or four days after placed in ooze shave the hides and remove the old bark and add fresh. At the end of ten days after placed in the ooze add a bushel and a half of manure, and the hides will be completely tanned within thirty or thirty-five days after put into ooze.

To tan calf-skins, mix in the proportion of six bushels of bark with a bushel and a half of manure. Thus, to tan sixty or sixty-five calf-skins, mix six bushels of bark with a bushel and a half of manure. At the end of three days remove the old bark and add eight bushels of fresh. At the end of eight days after placed in the ooze shave the hides. At the end of two days thereafter add a bushel and a half of manure. Within twenty or twenty-five days after placed in ooze the hides will be sufficiently tanned.

What we claim as new, and desire to secure by Letters Patent, is—

The employment or use of manure in combination with bark or other tanning material, substantially as and for the purpose set forth.

SANFORD A. HICKEL,
CALVIN ARMSTRONG.
JAMES ARMSTRONG.
BENJ. F. ARMSTRONG.

Witnesses:
R. E. STARCHER,
J. E. BROWN.